No. 630,720. Patented Aug. 8, 1899.
C. & H. LINDENBERGER & W. B. TEAL.
STORAGE BATTERY.
(Application filed Mar. 1, 1899.)
(No Model.)
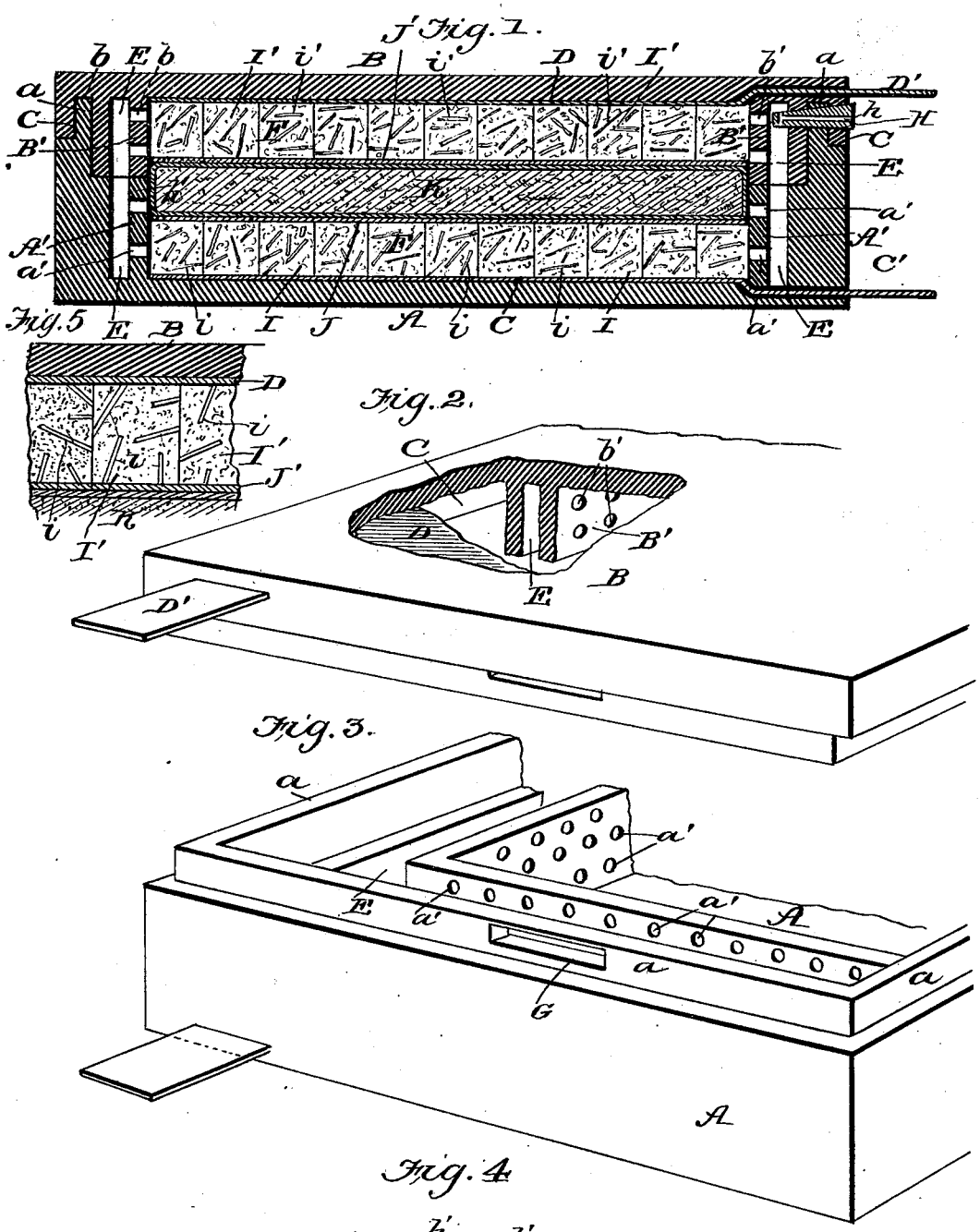
WITNESSES:
Jos. A. Ryan
Perry B. Turpin
INVENTORS
Charles Lindenberger
Harry Lindenberger
William B. Teal.
BY
Munn & Co.
ATTORNEYS.

UNITED STATES PATENT OFFICE.

CHARLES LINDENBERGER, HARRY LINDENBERGER, AND WILLIAM B. TEAL, OF HANNIBAL, MISSOURI, ASSIGNORS OF ONE-THIRD TO WILBERT H. COBB, OF SAME PLACE.

STORAGE BATTERY.

SPECIFICATION forming part of Letters Patent No. 630,720, dated August 8, 1899.

Application filed March 1, 1899. Serial No. 707,351. (No model.)

*To all whom it may concern:*

Be it known that we, CHARLES LINDENBERGER, HARRY LINDENBERGER, and WILLIAM B. TEAL, residing at Hannibal, in the county of Marion and State of Missouri, have made certain new and useful Improvements in Storage Batteries, of which the following is a full, clear, and exact specification.

This invention is an improvement in storage batteries, and has for an object, among others, to provide an improved construction of case or shell for containing the battery elements, seeking to so construct such shell as to provide around the chamber for the battery elements a space to receive the electrolytic liquid and to furnish vents for the passage of such liquid to the battery elements, and, further, to provide improvements in the binding-posts or terminals for the positive and negative battery elements and to provide other improvements, as will be described.

The invention consists in certain novel constructions and combinations of parts, as will be described and claimed.

In the drawings, Figure 1 is a vertical transverse section of a battery provided with our improvement. Fig. 2 is a detail perspective view, partly broken away, of the cap or top section. Fig. 3 is a detail perspective view of the base or pan section. Fig. 4 is a detail view of the sealing-plug, and Fig. 5 is a detail view illustrating the electrode.

The case is composed of the pan A and the cap B, which are fitted together at their meeting edges by a rabbeted joint at C, which is preferably effected by grooving the depending flange of the cap at $b$ to receive a rib $a$, formed at the upper edge of the side or flange of the base-pan A, as is best shown in Fig. 1. While the case may be made of any suitable material, it is preferred to form its sections A and B of hard rubber and to receive the battery-plates C and D, the former resting upon the upper side of the bottom of the pan and the latter against the under side of the top of the pan, such plates C and D being extended through and beyond the upright walls of their respective supports, the extensions C' and D' forming the terminals or binding-posts, and such extensions where they pass through the walls of their supports being vulcanized to form a tight joint, as will be readily understood from Fig. 1.

The sections A and B are provided with inwardly-projecting plates A' and B', which are continuous and are spaced apart from the inner faces of the sides of said sections, thus forming the chamber E for the circulation of the electrolyte. The plates A' and B' meet at their inner edges, as shown in Fig. 1, and these plates are perforated at $a$ and $b$ for the passage of the electrolyte from the chamber E to the active elements contained in the chamber F within the space inclosed by the plates A' and B'. In practice the battery elements may be placed in the pan and in the inverted cap, the parts refitted together, as shown in Fig. 1, and the electrolyte be supplied to the chamber E through the opening G, formed through the upright rim of the pan. This opening G may incline downward toward its inner end and is normally closed by the plug H. (Shown in Fig. 4.) This plug is tapered to fit the opening G and is provided with the vent-openings $h$, which have the upright branches $h'$ and the outwardly-inclined branches $h^2$, as shown in said Fig. 4.

As before suggested, the lead battery-plates C and D are secured permanently within the battery-case, and in practice the active elements, positive and negative, rest against their respective battery-plates without being secured thereto. This permits the renewal of the said elements without necessitating the removal or displacement of the plates, and thus simplifies the construction and renders the operation of renewing the battery quite convenient.

The battery elements are preferably formed, as shown in Figs. 1 and 3, of small blocks or cubes, which lie against the battery-plates and may be formed to fit within the chamber F, and thus aid in simplifying the renewal of the battery. In practice we make the positive and negative blocks I and I' alike and embed promiscuously therein lead wires or strips $i$ and $i'$, leading to the surface of the blocks. It should be understood, however, that these blocks are of material suitable to form the positive and negative elements, the positive element I being of red lead and the element I' of litharge. Next to the inner faces of the blocks I I' we provide sheets J J', of asbestos paper, between which is a pad K, of charcoal and bibulous paper.

In operation when the battery is properly charged with the elements I I' the electrolyte may be supplied through the opening G, and will then circulate within the chamber E and through the openings $a'$ $b'$ into contact with the active elements, which by the cube or block construction afford a large surface for the action of the electrolyte.

Having thus described our invention, what we claim, and desire to secure by Letters Patent, is—

1. In a storage battery, a battery-case composed of sections fitted together and having within it a continuous perforated partition spaced apart from its walls and forming a chamber for the circulation of the electrolyte substantially as set forth.

2. In a storage battery a battery-case composed of a pan and a cap fitted together each having a projecting plate spaced apart from the outer wall of the case forming a chamber for the electrolyte and such plates being arranged to meet at their inner edges and being perforated for the passage of the electrolyte to the inner chamber adapted to contain the battery elements substantially as set forth.

3. In a storage battery a battery-case composed of a pan and a cap having their side flanges fitted together and provided with inwardly-projecting flanges or plates spaced apart from their sides forming the chamber for the electrolyte and perforated for the passage of such electrolyte substantially as set forth.

4. In a storage battery the combination of the case composed of the pan and the cap fitted together and each having a projecting plate spaced apart from the sides of the case forming a chamber for the electrolyte and perforated for the passage of same and the battery-plates lying against the inner faces of the bottom of the pan and the top of the cap and having their terminal extensions passed through the case substantially as set forth.

5. In a storage battery the electrode composed of blocks or cubes fitted side by side and provided with numerous embedded wires or strips leading to the surfaces of the blocks whereby to form numerous contact-points at the abutting sides of the blocks or cubes substantially as set forth.

6. In a storage battery the case composed of the pan or tray and the cap both such parts having sides provided with rabbets whereby they fit together, the perforated plates projecting from the bottom of the pan and the top of the cap and being spaced apart from the sides of the case and meeting at their inner edges and the battery-plates fitting in said cap and pan and having their terminal extensions passed through the sides of the case substantially as set forth.

7. In a storage battery, a battery-case composed of the pan and cap having overlapping portions provided with registered openings combined with the vented plug fitted in said openings substantially as set forth.

CHARLES LINDENBERGER.
HARRY LINDENBERGER.
WILLIAM B. TEAL.

Witnesses:
F. W. HIXSON,
JNO. A. STONE.